CRYOGENIC MEANS FOR COOLING DETECTORS

Filed April 30, 1963 2 Sheets-Sheet 1

INVENTORS
URBAN E. GROSS, JR.
ALFRED I WEINSTEIN

Feb. 23, 1965 U. E. GROSS, JR., ETAL 3,170,306

CRYOGENIC MEANS FOR COOLING DETECTORS

Filed April 30, 1963 2 Sheets-Sheet 2

INVENTORS
URBAN E. GROSS, JR.
ALFRED I. WEINSTEIN

BY Edward O. Ansell

ATTORNEY

United States Patent Office 3,170,306
Patented Feb. 23, 1965

3,170,306
CRYOGENIC MEANS FOR COOLING DETECTORS

Urban E. Gross, Jr., Anaheim, and Alfred I. Weinstein, Whittier, Calif., assignors to Aerojet-General Corporation, Azusa, Calif., a corporation of Ohio
Filed Apr. 30, 1963, Ser. No. 276,909
8 Claims. (Cl. 62—165)

This invention in general relates to cooling by evaporation and more particularly to low temperature cooling by sublimation.

A variety of components presently available or under development require cooling to cryogenic temperatures for efficient operation. Infrared detectors and other semiconductors are included in one group of such components.

Cryogenic techniques used to date to effect cooling of small components include the use of liquefied gases, such as nitrogen, hydrogen, neon and helium, and of cryostats, which liquefy these gases in special test chambers. Laboratory cooling may be effected without unreasonable restrictions on the size, weight, operating time and accessibility of the cooling equipment; however, cooling outside of the laboratory has imposed many restrictions on the cooling systems utilized.

Limitations on configuration, materials, and accessibility of the cooling equipment may be resolved through present methods and techniques for airborne use. However, restrictions placed upon such cooling when the components are to be operated at cryogenic temperatures in an unmanned space vehicle are extremely critical and not satisfactorily overcome through the use of present cooling techniques.

Mechanical cooling systems have many disadvantages as to space applications, for example in power requirements, vibration, heat removal from the system, and absence of long-term durability. It is evident, therefore, that novel techniques must be applied to cooling systems for use in space. The present invention provides a novel approach which avoids the disadvantages of mechanical cooling systems and other systems which may operate satisfactorily in airborne equipment but which would not operate satisfactorily in space.

Accordingly, it is an object of the present invention to provide a cooling system which is adaptable for use in space.

It is another object of the present invention to provide a cooling system adaptable for use in space which has or requires a minimum of mechanical parts.

It is a further object of this invention to provide a cooling system adaptable for operation in space which requires no special means of heat removal.

It is a still further object of the present invention to provide a cooling system adaptable to operation in space in which no power is required.

Other objects and many of the attendant advantages of this invention will be readily appreciated as the same becomes better understood by reference to the following detailed description when considered in connection with the accompanying drawings wherein.

Generally stated, the present invention involves a system for low temperature cooling which preferably utilizes sublimation but may use evaporation to effect cooling through, respectively, a solid or liquid mass acting as a heat sink. The heat sink may be maintained at temperature to 10° K. and below in the case of a solid heat sink, and to ambient in the case of a liquid heat sink. Components or items in thermal contact with the heat sink may be maintained at the heat sink temperature for extended periods of time. Although the system is operable in space without any power required to be supplied to it, it is also operable in the earth's atmosphere through the application of a limited amount of power necessary to operate a small vacuum pump.

The present invention cools by initially providing a coolant at the required temperature. That is, a gas or liquid may be pre-cooled and solidified in the system by a conventional freezing technique prior to operation. The major cooling effort is carried externally to the system when power and weight are not critical. In space application, the system requires no power, one moving part in a pressure relief valve, no heat removal equipment and no maintenance. Absence of gravity has no effect upon the operation of this system.

Figure 1:
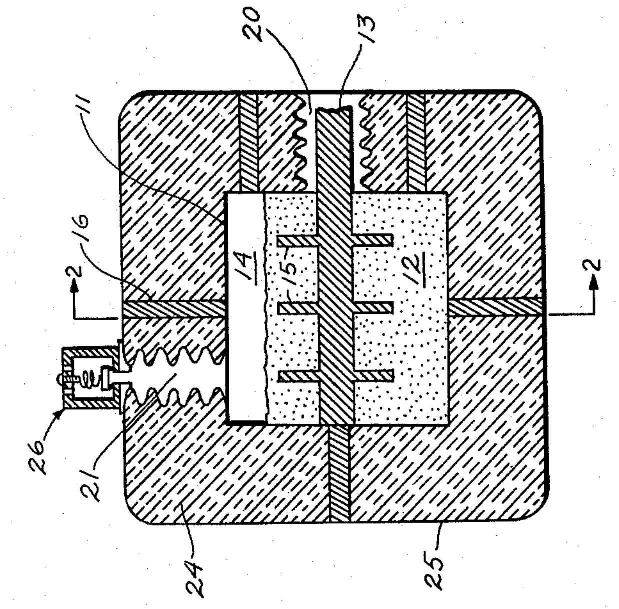
FIG. 1 is a side elevation in section of one embodiment of the invention.

Referring now to FIG. 1 there is shown a device comprising an inner container 11 whose inner space defines a chamber which is occupied by coolant 12, heat transfer rod 13, and gas space 14. Rod 13 may have fins 15 extending therefrom to promote heat distribution. However, fins are required only where large amounts of heat must be dissipated. Supports 16 are attached at one end thereof to the walls of the inner container 11, the supports 16 extending outwardly from the inner container 11 and being connected at their other ends to the walls of an outer container 25 which surrounds the inner container 11. The supports 16 thereby retain the inner container 11 within the outer container 25 in substantially centered relationship. The supports 16 may be made of Nylon or Dacron or may be fine stainless steel wires or other materials of low thermal conductivity. Negligible heat is transferred through the supports 16.

Solidified or frozen coolant 12 surrounds heat transfer rod 13 which may be extended through a wall of the inner container 11 and the outer container 25. Rod 13 is conductively connected to the components or items to be cooled. The heat transfer rod 13 is attached at one end to inner container 11 and at the other end extends through an opening therein sufficiently large to permit contraction of the rod 13 but sealed sufficiently to retain a liquid in the container 11. The container 11 is partially filled by coolant in a liquid state after which the coolant is solidified by freezing. Insulation 24 may be applied in the space defined between the outer container 25 and the inner container 11 before or after filling of the container 11 with coolant. Access port 20 and gas escape port 21 are the only interruptions in the insulation 24 which surrounds the inner container 11. Some embodiments may employ one port for access and exhaust. The outer container 25 may be removale for certain space applications.

Insulation 24 is of a material which provides a particularly effective thermal barrier, such as a material having an effective thermal-conductivity value on the order of 0.5 microwatt per cm.-° C. which has been demonstrated to be a satisfactory value. An insulation material suitable for this purpose is disclosed in copending U.S. patent application, Serial No. 220,365 filed August 30, 1962. Such insulation has alternate layers of reflector material and insulator material, thus providing reflective surface to minimize both radiation losses from within the insulation and heat increases via exterior radiant energy. Access port 20 and escape port 21 are of bellows construction and as such provide a path length many times the insulation thickness.

A bellows is used around port 21 to provide a long thermal path to reduce heat conduction between the wall of the outer container 25 and the wall of the inner container 11. The escape port 21 is connected to a pressure control valve 26, shown schematically, whose function is to maintain a selected pressure in gas space 14. Maintaining a selected pressure over coolant 12 maintains the coolant at a related temperature. The pressure-temperature relationship maintained is a function of the coolant used. Each coolant has its particular temperature-pressure relationship, so the selection of coolant is governed by the temperature at which the cooling system must operate. This temperature in turn determines the pressure which must be maintained in the gas space 14 by the pressure control valve 26.

The bellows of each port 20 and 21 are preferably of metal and have a thickness of 0.010 inch, or less. It will be appreciated that increased insulation may be realized for the device because of the bellows where a heat-path length of 20 times or more than the insulation thickness is provided. However, gains in the insulation obtained through increases in the path lengths of the ports 20 and 21 may be offset by the weight penalty in the excess metal necesary to form the bellows conforming to the path lengths.

Figure 2:
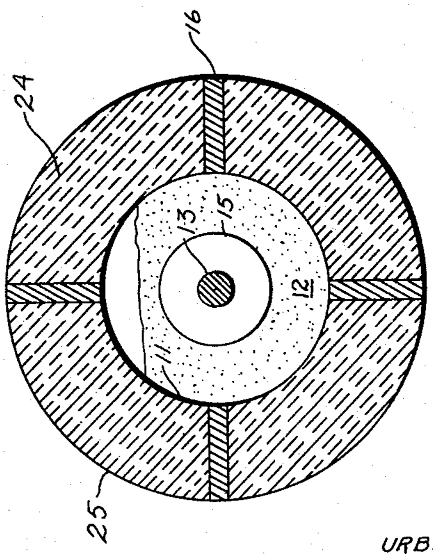
FIG. 2 is a transverse sectional view taken along the line 2—2 of FIG. 1.

The transverse section of FIG. 2 demonstrates the cylindrical configuration of the cryogenic device shown in FIG. 1. It will be realized that other shapes, such as a sphere, also having a low surface-to-volume ratio, or other simple configurations may be used as the shape of the device within the concept of the invention. Various ratios of length of the device to its diameter may also be used within the concept of the invention, the embodiment shown having a ratio in which the length of the cylinder is equal to the diameter of the cylinder.

Figure 3:
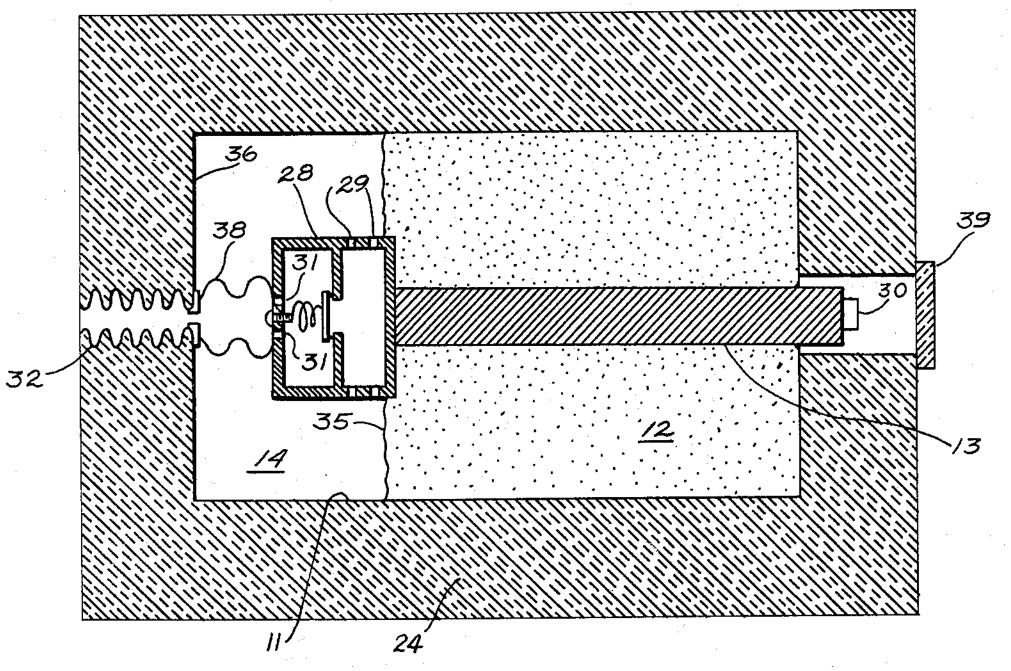
FIG. 3 is a side elevation in section of an alternate embodiment of the invention.

An alternate embodiment of the invention is illustrated in FIG. 3 wherein heat transfer rod 13 is shown terminating in an area within insulation 24. A detector 30 or other component or element to be cooled is positioned on the rod 13 in such a manner as to provide effective heat transfer from the component 30 to the rod 13.

Where the element to be cooled need not be exposed, it may be conductively connected to the rod 13 within the coolant 12. That is, rod 13 may in some instances be positioned entirely within coolant 12. A pressure control valve 28 is attached to the other end of rod 13, the valve 28 having inlet ports 29 and outlet ports 31 for permitting escape of gas from space 14 under selected pressure conditions therein. Valve 28 is shown schematically only, it being appreciated that a variety of control valves each operable under variable selected pressures may be used within the scope of the invention. For example, valve 28 may be an adjustable, diaphragm-actuated relief valve in lieu of the spring loaded valve shown. Having the valve adjustable would permit changes to be made in the temperature to be maintained, as well as permitting the use of the chamber defined by container 11 at different selected temperatures. The valve 28, when positioned within the chamber defined by container 11, may contact or be contiguous with heat transfer rod 13, as shown in FIG. 3 without significantly affecting the operation of the device. This is possible because all of the elements of the device within the container 11 are maintained at substantially the same temperature.

As with the embodiment of FIG. 1, the component to be cooled is maintained at a particular temperature through the pressure-temperature relationship of coolant 12. The temperature at which the component is to be maintained determines the pressure to be maintained in gas space 14. The volume of gas discharged from the device is thus directly related to the amount of heat energy to be dissipated.

A bellows is positioned about the exhaust port 32 to provide, as before, a long thermal path from the container 11 through the insulation 24.

The outer container 25 of the embodiment of FIG. 1 has been omitted in the embodiment of FIG. 3. In this respect, the insulation 24 may be made of sufficient rigidity to maintain its configuration, the insulation either having its outer surface sealed or covered with a thin membrane to prevent heat conduction by convection therethrough.

The embodiment of FIG. 3 is assembled by inserting heat transfer rod 13 into the container 11 before an end wall 36 of the container 11 is sealed in place to close one end of the container 11. The rod 13 is attached to the opposite end wall of the container 11 at a position thereon adjacent the end of the rod 13 to which the component 30 is to be connected by welding, soldering or similar means. The opposite end of the heat transfer rod 13 is spring loaded against the end wall 36 of the container 11 as that end wall 36 is mounted in place. Spring loading of the rod 13 is provided by a spring bellows 38 with the pressure control valve 28 being interposed between the rod 13 and the spring bellows 38. The spring bellows 38 serves the dual function of isolating the exhaust route from the space 14 and maintaining compression against rod 13. It is desirable to permit movement of rod 13 to accommodate contraction when a liquid coolant introduced through valve 28 is solidified in the container 11 and to accommodate expansion after the coolant 12 has sublimed.

A component to be cooled may be positioned within the container 11 if it is not necessary that the component be exposed to radiant energy. In such case, the end of rod 13 remote from valve 28 may terminate within the chamber defined by container 11 and be attached for support to the wall of the container 11 by conventional means such as brackets. A component dissipating heat within the coolant 12 may cause localized sublimation. However, solidified gases used as coolants, e.g. hydrogen, methane, etc., will contain sufficient gas to permit enough conductivity to occur to maintain the heat transfer rod 13 at a constant temperature. Where unusual heat is expected, fins similar to the fins 15 on the heat transfer rod of the embodiment shown in FIGS. 1 and 2 may be attached to the rod 13 to extend the surface area of the rod.

The level 35 of coolant 12 may extend substantially to the end wall 36 of the container 11 if desired. Tubes, not shown, could then connect inlet ports 29 to a gas space of reduced volume. Window 39 in FIG. 3 closes and seals the opening through the insulation 24 for accommodating rod 13. Other means, not shown, for sealing this opening or access port may be used where passage of light to a component is not required. In this respect, the bellows in the access port 20 in FIG. 1 has been omitted in the embodiment of FIG. 3.

In the operation of both illustrated embodiments, heat from the item or component to be cooled flows through the heat transfer rod into the solid coolant causing sublimation at the surface of the coolant. The gases formed pass out of the container 11 into a lower pressure environment. Where the environment is of such infinitely low pressure as exists in space, no power is required for operation of the device. Where the device is operated in a high pressure environment, a small vacuum pump (not shown) associated with the container 11 is required to exhaust the sublimated gas.

The low temperature cooling system of the present invention permits the use of low pressure to provide lower temperatures in the coolant material. Special insulation techniques may increase or enhance the long-term storage feature of the coolant for the system by reducing the quantity of radiated and conducted heat from reaching the coolant.

The use of bellows for the various ports acts to reduce the heat load on the system. The bellows provide a much greater thermal impedance than thin-wall straight tubing or other conventional tubing. The component or item to be cooled is conductively connected to the heat transfer rod and essentially therefore is enclosed in a Dewar type of container. If the component requires access to radiation, proper window material may be provided on the outer surface of the device which may be extended to surround an extension of the heat transfer rod. In such case, a component such as an infrared detector may be cooled through the technique of the present invention and still be completely housed within an insulated chamber. The window in the outer wall extension would permit transmission of photons of various energies of interest to the detector. Leads from various electrical or electronic components, not shown, may be brought out through low heat transfer insulated vacuum seals, not shown, which may be included in the walls of the device.

The cooling system of the present invention is particularly suited for cooling of infrared detectors and other electronic components which achieve greatest efficiency at reduced temperatures. The amount of coolant required for the particular application is basically determined by the total system heat and length of operation. The present system may be used to cool exotic electronic components such as lasers, masers, magnetic-core memory devices, and many types of solid state devices. Either a solid or liquid coolant may be used within the concept of the invention. Where the coolant is a liquid, additional conventional components not shown may be required to prevent its escape.

Obviously many modifications and variations of the present invention are possible in the light of the above teachings. It is therefore to be understood that within the scope of the appended claims the invention may be practiced otherwise than as specifically described.

We claim:

1. A device for maintaining circuit components at cryogenic temperatures comprising chamber means having heat transfer means extending thereinto, an outer container substantially surrounding said chamber means, insulation means maintained between said chamber means and said outer container, support means supporting said chamber means within said outer container, port means providing ports for venting said chamber means and for accommodating a portion of said heat transfer means, solid coolant means partially filling said chamber means, and said heat transfer means being adapted to be connected in thermally conductive relationship to a component to be cooled whereby gases released by heat transferred to said chamber means from said heat transfer means are discharged through said port means.

2. The device claimed in claim1 further including pressure control means operably connected to said port means to regulate the discharge of gases from said chamber means at a selected pressure.

3. A device for cooling and maintaining circuit components at cryogenic temperatures through pressure control comprising chamber means having heat transfer means extending thereinto, insulating means substantially enclosing said chamber means, port means for accommodating an end portion of said heat transfer means, solidified fluid means partially filling said chamber means, said solidified fluid means substantially surrounding said heat transfer means, said heat transfer means being adapted to be connected in thermally conductive relationship to a component to be cooled, exhaust port means for permitting escape of gas from said chamber means, and pressure control means operably connected to said exhaust port means whereby heat transferred to said chamber means from said heat transfer means will cause partial sublimation of said solidified fluid means and the gases formed will be released at a selected pressure through said exhaust port means to maintain the component at a desired temperature.

4. The device claimed in claim 3 wherein said chamber means has a shape having a low surface-to-volume ratio.

5. The device claimed in claim 3 wherein a bellows bounds said exhaust port means and said exhaust port means conforms to the shape of the bellows to provide a long conductive path.

6. A device for cooling and maintaining components at cryogenic temperatures comprising chamber means having heat transfer means therein, insulating means surrounding said chamber means, low temperature conductivity exhaust means traversing said insulating means and communicating with said chamber means, solidified fluid means substantially filling said chamber means, said heat transfer means being adapted to be connected in thermally conductive relationship to a component to be cooled, and pressure control means associated with said chamber means and said exhaust means to regulate communication between said chamber means and the environment in which said chamber means is disposed whereby gases released by heat transferred to said chamber means from said heat transfer means are discharged from said chamber means through said pressure control means at a selected pressure.

7. A device for cooling and maintaining components at cryogenic temperatures, said device comprising an inner container defining a chamber, an outer container substantially surrounding said inner container, a plurality of support members extending between said inner and outer containers to retain said inner container in radially inwardly spaced relationship to said outer container, insulation material filling the space between said inner and outer containers, an elongated rod of heat transferring material received in the chamber defined by said inner container, means defining an access port through said insulation material and communicating with said inner container, said access port receiving an end portion of said rod therein, the other end of said rod being secured to an end wall of said chamber remote from said access port, a solidified coolant substantially filling said chamber in surrounding relation to said heat transfer rod, said end portion of said heat transfer rod being adapted to be connected in thermally conductive relationship to a component to be cooled, means defining an exhaust port through said insulation material providing communication between the unfilled portion of said chamber and the environment in which the device is disposed, and pressure control means operably connected to said exhaust port, whereby heat transferred to said chamber from said heat transfer rod will cause partial sublimation of said solidified coolant and the gases formed will be released at a selected pressure through said exhaust port to maintain the component at a desired temperature.

8. A device for cooling and maintaining components at cryogenic temperatures, said device comprising means defining an insulated chamber, an elongated rod of heat transferring material positioned in said chamber and being secured adjacent one end thereof to an end wall of said chamber, means defining an access port communicating with the end wall of said chamber to which said rod is secured and receiving said one end of said rod therein, means defining an exhaust port communicating with said chamber through the other end wall thereof, a solidified coolant substantially filling said chamber in surrounding relation to said heat transfer rod, said one end of said heat transfer rod being adapted to be connected in thermally conductive relationship to a component to be cooled, a pressure control valve means having inlet and outlet ports disposed in said chamber and connected to the other end of said heat transfer rod, a spring bellows connected between said other end wall of said chamber and said pressure control valve means, said spring bellows being in registration with said outlet port of said pressure control valve means and said exhaust port to apply compression to said heat transfer rod and to isolate the unfilled portion of said chamber from said exhaust port, said inlet port of said pressure control valve means connecting the unfilled portion of said chamber to said outlet port of said pressure control valve means for providing communication between said chamber and the environment in which said chamber is disposed through said exhaust port, whereby heat transferred to said chamber from said heat transfer rod will cause partial sublimation of said solidified coolant and the gases formed will be released at a selected pressure through said pressure control valve means, said spring bellows, and said exhaust port to maintain the component at a desired temperature.

References Cited in the file of this patent

UNITED STATES PATENTS

| | | |
|---|---|---|
| 2,089,566 | Meinzer | Aug. 10, 1937 |
| 2,948,127 | Carter | Aug. 9, 1960 |
| 3,079,504 | Hutchens | Feb. 26, 1963 |